April 28, 1970     G. T. McCOPPIN     3,508,892
APPARATUS FOR FORMING MULTIFILAMENT STRAND Filed April 26, 1967     2 Sheets-Sheet 2

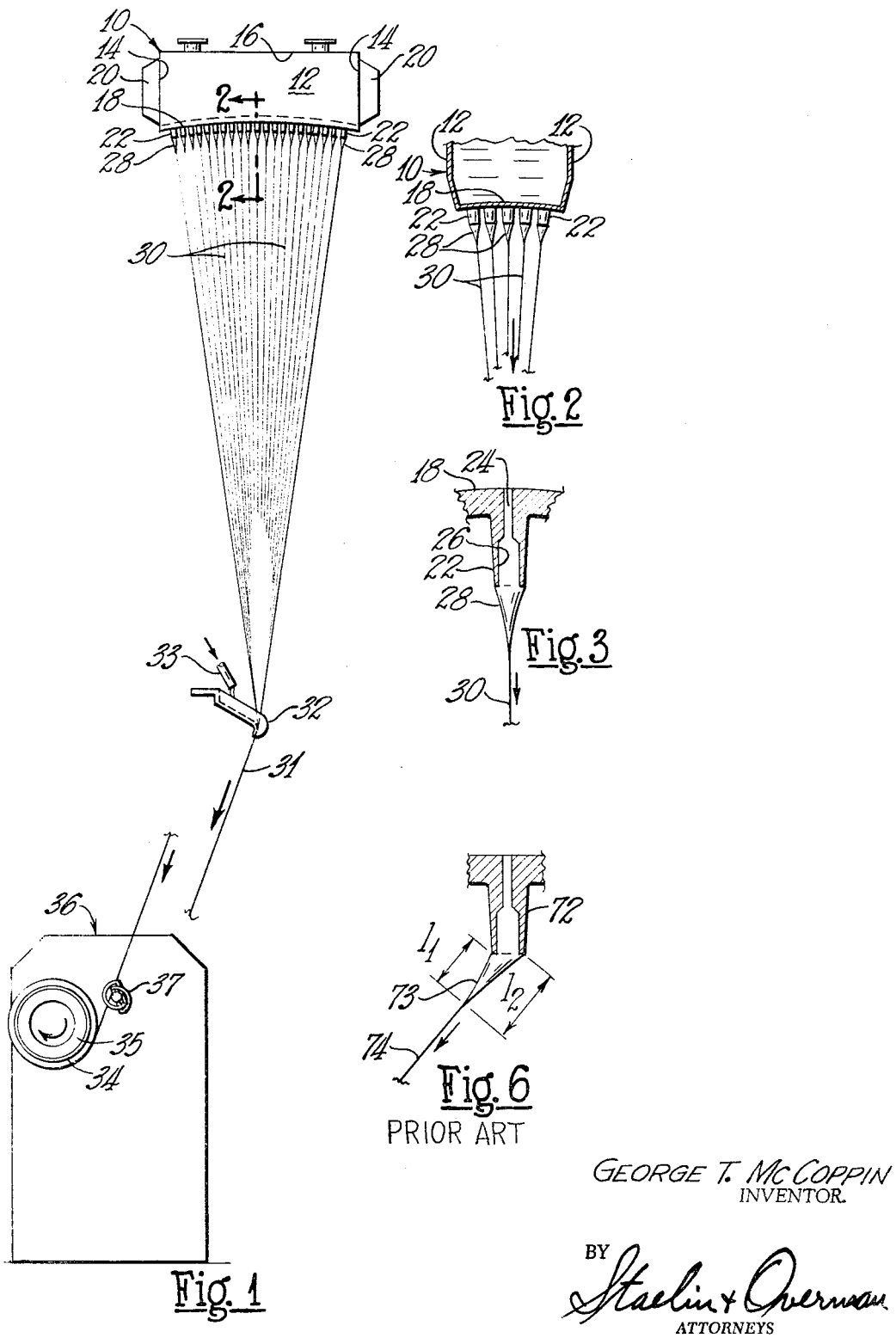

INVENTOR.
GEORGE T. McCOPPIN
BY
Staelin & Overman
ATTORNEYS

United States Patent Office 3,508,892
Patented Apr. 28, 1970

3,508,892
APPARATUS FOR FORMING MULTIFILAMENT STRAND
George T. McCoppin, Newark, Ohio, assignor to Owens-Corning Fiberglas Corporation, a corporation of Delaware
Filed Apr. 26, 1967, Ser. No. 633,965
Int. Cl. C03c 27/00
U.S. Cl. 65—11                         3 Claims

ABSTRACT OF THE DISCLOSURE

Forming mineral fibers such as glass fibers into a strand or the like by flowing molten material through a plurality of closely spaced orifices in a wall to provide individual streams at their outlets and attenuating each filament along a path that is aligned to form a straight line with the flow axis of its associated orifice; combining the filaments into a strand.

BACKGROUND OF THE INVENTION

While continuous multifilament strands are produced with good strength and stability characteristics, maximum glass filament strengths have not been realized. It has been possible to attenuate glass filaments and combine them into strands where the filaments have enhanced strength characteristics by using improved glass compositions, melting techniques, sizing materials and the like; however, it has not heretofore been recognized that these fine filaments are adversely affected by certain nonuniform fiber forming conditions in the attenuating zone or region such as attenuating the filaments from streams of molten glass along paths that extend individually at various angles different from the flow direction of the molten glass through the wall of the container supplying the molten glass and exposing different portions of the molten streams to various temperature intensities.

Present apparatus for attenuating continuous glass fibers employs a feeder container for holding and heat conditioning a body of glass that has depending orificed tips through which molten glass is delivered to their outlets as molten streams. The glass filaments attenuated from the molten glass streams are gathered into a strand at a point that is not oriented with the tips; hence, the filaments are drawn along paths at various longitudinal angles relative to the axis of the tips. Because of this prior art practice, mechanical and temperture nonuniformities are introduced to the glass in the fiber forming process that substantially inhibits realization of maximum strength glass filaments, particularly tensile strength, and strands made from them.

Nonuniformities have increased importance in view of present practice where larger feeder containers are employed with up to 2000 glass filaments attenuated from molten streams provided on a wall, viz. the bottom wall, of a feeder container. Dissimilarities in mechanical nonuniformity, e.g. angular differences in filament attenuation paths, and thermal nonuniformities in the fiber forming region are magnified.

SUMMARY OF THE INVENTION

An object of the invention is apparatus and method for producing glass fibers having improved strength characteristics.

Another object of the invention is filament forming apparatus and method providing uniform filament forming conditions for all filaments.

Another object of the invention is a multifilament strand having improved strength produced by method and apparatus flowing heat softened material held in a container through a plurality of straight passageways in one wall of the container to provide a plurality of streams of the material and attenuating filaments from the individual streams by drawing each filament along a path coaxial with the longitudinal axis of its associated passageway.

Still another object of the invention is an improved feeder from which increased strength filaments are formed by providing uniform forming conditions to each filament.

DESCRIPTION OF THE DRAWINGS

Further objects and advantages of the invention will become apparent as the invention is hereinafter described in more detail with reference made to the accompanying drawings in which:

FIGURE 1 is a somewhat schematic elevational view of a preferred arrangement illustrating a method and apparatus for forming continuous glass filaments into a strand according to the principles of the invention;

FIGURE 2 is a fragmentary vertical sectional view of the invention as shown in FIGURE 1 taken along line 2—2;

FIGURE 3 is an enlarged sectional view taken at any one of the tips of FIGURE 1 or 2;

FIGURE 6 is an enlarged fragmentary sectional view illustrating the orientation of a stream and its associated filament drawn from a position at one extremity of a feeder in accordance with the prior art.

DESCRIPTION OF THE PREFERRED EMBODIMENTS

Figure 4:
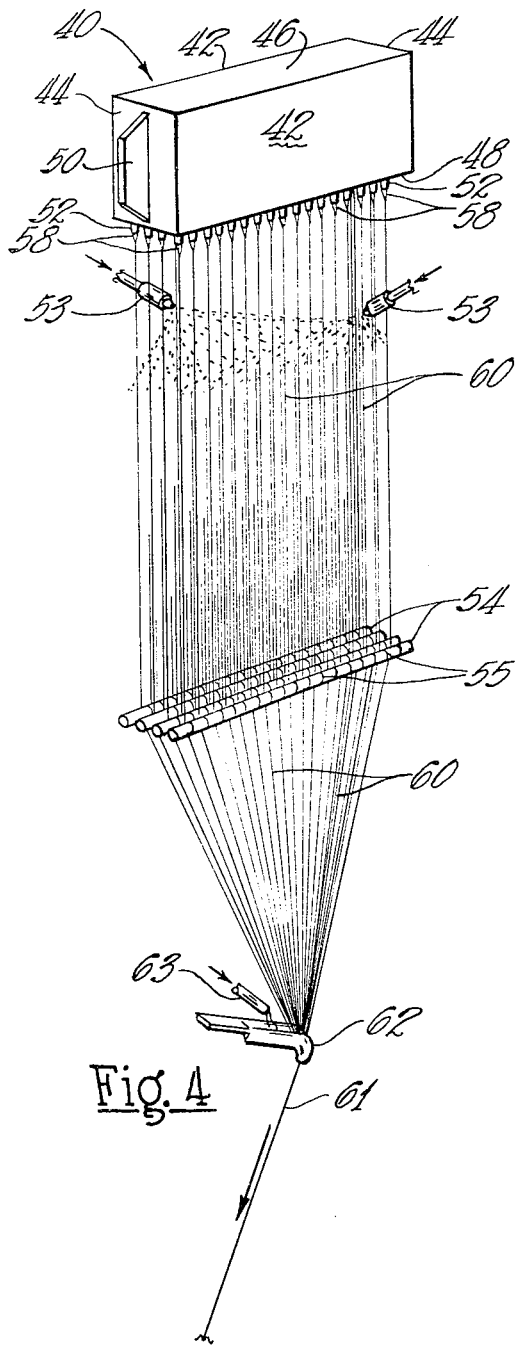
FIGURE 4 is a perspective view of another form of the invention.

While the method and apparatus of the invention have particular utility for forming textile strands of glass, it is understood that the method and apparatus of the invention may be used for conditioning and processing other heat-softenable and fiberizable materials.

While the orificed projection or tubular member shown in FIGURE 3 is depicted with a restricted bore and a larger counterbore, it is understood that the method and apparatus of the invention is not restricted to any particular detail of such construction.

Referring to FIGURES 1 through 3, a preferred embodiment of the invention is illustrated for forming a glass strand that includes a melter and feeder container 10 for holding and heat conditioning a body of glass. The container 10 is provided with side walls 12, end walls 14 and a lid or cover 16 that is adapted to receive pieces of glass such as marbles into the container 10. The lid 16 may be modified to introduce into the container 10 glass, glass batch material and the like. Further, the container has a bottom wall 18 that is shaped as a spherical segment disposed with its concave side as the external surface of the bottom of the container 10.

The container 10 is electrically resistance heated in a conventional manner to maintain a supply of molten glass. Electrical current is supplied to the container 10 at the terminals 20, which are located on the end walls 14, from a source (not shown).

Orificed projections or tubular members 22 extend radially from the concave spherical shaped surface of the bottom wall 18 towards the center of the sphere defining the bottom wall 18. The orificed projections 22 have passageways 24, as shown in FIGURE 3, through which the molten glass flows to provide streams 28 at their outlets. Each passageway 24 may be made with a counterbore portion 26 beginning intermediate the ends of the passageway 24 and extending to its outlet, as shown in FIGURE 3, or may be made in any suitable shape such as cylindrical.

The streams 28 are attenuated into filaments 30 and combined into a multifilament strand 31 by a gathering device 32 that is located at the center of the sphere defining the bottom wall 18 of the container 10. A conventional sizing fluid or other coating material may be applied to the filaments 30 by the device 32 with fluid supplied to it from a source (not shown) by an appropriate supply means 33.

After the continuous filaments 30 are combined to form the multi-filament strand 31 by the gathering device 32, the strand 31 is collected. As shown in FIGURE 1, the strand 31 is wound on a tubular sleeve 34 mounted on a mandrel or collet 35 rotated by suitable motive means (not shown) comprising part of a winder 36 of conventional construction. A traverse such as a spiral wire 37 supported on the winder 36 adjacent to the sleeve 34 engages the strand 31 and reciprocates the strand 31 along the length of the sleeve 34 to build a package of superimposed strand layers.

The feeder container 10 is normally housed in insulating refractory (not shown) that encases the container 10 in a conventional manner. The refractory reduces heat losses from the container 10.

Because the projections 22 (including their passageways 24) extend radially from the concave spherical shaped surface of the botom wall 18 of the container 10 to focus on the center of the sphere defining the wall 18, the flow axis of the molten glass through the wall within each of the projections 22 and each stream 28 combines with the path of attenuation for each of the filaments 30 from its associated stream 28 to the gathering device 32 to form a straight line. In the FIGURES 1 through 3, the flow axis of the molten glass is straight along the longitudinal axis of each of the projections 22 and the path of each of the filaments 30 is an extension of the longitudinal axis of its associated projection 22. This means that the flow of the molten glass through the wall 18 to the streams 28, which in the case of the apparatus illustrated in FIGURES 1 through 3 includes the flow to the outlet of the projections 22, is straight and radial towards the device 32. The path of each filament 30 is also radial towards the device 32.

Because the radial path of each of the filaments 30 falls along an extension of the longitudinal axis of its associated projection 22, each of the streams 28 is drawn into substantially a right cone-shaped configuration having its surface a uniform height along all portions. Further, the radial extension of the projections 22 and right cone-shaped streams 28 disposes the streams in an upstanding manner with all portions equidistant from the surface of the wall 18.

While the exterior surface of the botom wall 18 is illustrated in FIGURES 1 through 3 as a concave spherical configuration, other appropriate arcuate surfaces such as a wall having its exterior surface concave in all directions. In the latter case the gathering device at the center of the radius of curvature and the projections would extend to focus thereon.

In the operation of the apparatus illustrated in FIGURES 1 through 3, molten glass is delivered to the outlets of each of the projections 22 as molten streams 28 that are individually attenuated into the filaments 30. Molten glass progressing through the bottom wall 18 in the passageways 24 moves straight along flow axes concomitant with the longitudinal axis of each of the projections 22 (and passageways 24). Each filament 30 is attenuated from an individual stream 28 along a path that is an extension of the longitudinal axis of its associated projection 22 (and passageway 24). The filaments 30 are combined into the strand 31 at the gathering device 32 and thence the strand 31 is drawn downwardly to the sleeve 34 for collection thereon. The linear speed of the strand 31 (filaments 30) may vary from several thousand feet-per-minute to 10,000 feet-per-minute or more.

Figure 5:
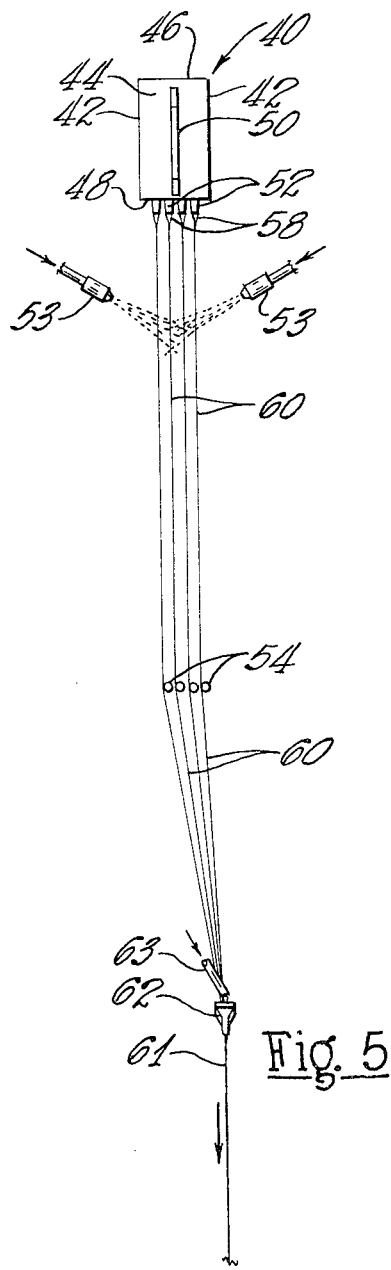
FIGURE 5 is an end view of the form of the invention shown in FIGURE 4.

FIGURES 4 and 5 show another embodiment of the invention that includes a melter and feeder container 40 for holding and heat conditioning the glass. The container 40 is provided with side walls 42, end walls 44 and a lid or cover 46, which (as in the case of the container 10) can be adapted to introduce glass batch material, molten glass or pieces of glass such as marbles. Further, the container 40 has a planar bottom 48.

The container 40 is electrically resistance heated in a conventional manner to maintain a supply of molten glass. Electrical current is supplied to the container 40 at the terminals 50 from a source (not shown).

Orificed projections or tubular members 52 extend at right angles from the planar bottom 48. As the passageways 24 of the projections 22 illustrated in FIGURE 3, the passageways of the projections 52 (not shown) may be any suitable shape, e.g. cylindrical. The molten glass flows through the projections 52 to form individual streams of molten glass 58 at the outlet of each of the projections 52.

The streams 58 are attenuated into filaments 60 and combined into a strand 61 by gathering device 62 after the filaments 60 have passed over guide means such as the guides 54. The strand 61 is collected by suitable means (not shown) such as the winder 36 arrangement illustrated in FIGURE 1. It is advantageous to apply a sizing or lubricant coating on the filaments prior to their passage over the guides 54 such as water or water plus a lubricant such as a cationic lubricant, e.g. tetraethylene pentamine stearate, applied to the filaments such as by fine mist from nozzles 53.

The guides 54 are located a spaced distance from the bottom of the container 40 and are positioned to direct the path of each of the filaments 60 from the streams 58 to the guides 54 coaxial with the longitudinal axis of its associated projection 52 (passageway), i.e. along the extension of each of the longitudinal axes of the projections 52. The filament travel in parallel paths to the guides 54. As shown in FIGURES 4 and 5, the guides 54 are horizontally disposed rods such as graphite rods, each rod having a plurality of grooves 55. The filaments 60 individually traverse the grooves 55, which cooperate with the rods 54 to maintain the paths of the filaments 60 in paralell paths. Moreover, the grooves 55 may be inclined to, in a sense, focus on the gathering device 62. The guides 54 are spaced from the bottom 48 at least a distance sufficient for the filaments to be solidified and acquire dimensional stability.

After the filaments 60 have left the grooves 55, they are gathered and combined by gathering device 62 into the strand 61. A conventional sizing fluid or other coating material may be applied to the filaments 60 by the device 62 with the fluid supplied from a source (not shown) by an appropriate supply means 63.

Because the projections 52 extend at right angles from the surface of the planar bottom 48, the flow axis of the molten material through the bottom wall 48 in the projections 52 is also at right angles to the surface of the bottom wall 48 and along the longitudinal axis of each of the projections 52 (and its passageway). The flow axis of the molten glass through each passageway and the path of each of the filaments from the individual streams 58 to the guides 54 combine to form a straight line.

In the operation of the apparatus illustrated in FIGURES 4 and 5, molten glass is delivered to the outlets of each of the projections 52 as molten streams 58 that are individually attenuated into the filaments 60. The molten glass progressing through the bottom wall 48 moves along flow axes coaxial with the longitudinal axis of each of the projections 52 (and passageway). Because the path of each filament 60 from the individual streams 58 to the guides 54 is directed by the guides 54 along an extension of the longitudinal axis of its associated projection 52, each of the flow axes of the molten glass combine with the path of its associated filament 60 to form a straight line. Each of the filaments 60 is pulled over the guides 54 in the grooves 55 and thence are combined into the strand 61 by the gathering device 62. The strand 61 may advance with a linear speed of from several thousand feet per minute to 10,000 feet per minute or more and is collected by any suitable conventional collection means.

Prior art is shown in FIGURE 6 for comparative purposes in order that the benefits of the present invention will be more readily apparent. Conventional melters and feeders of the prior art usually have a planar bottom wall with a multiplicity of bored tips that extend with the longitudinal axis normal to the bottom wall. Because the filaments are gathered at a common point below the melter bottom, the filaments are drawn at various angles from the longitudinal axes of the tips and in a sense, cause stresses in the filaments. At times these angles are large, such as shown in FIGURE 5 wherein a filament 74 is drawn at a substantial angle from a vertically disposed tip 72 from a glass stream 73. Further, while the molten stream 73 is cone shaped, its configuration is more generally an oblique or scalene cone, its axis being inclined to its base (the plane of the end of tip 72) and its sides being unequal. The length $l_1$ to which one side of the scalene cone 73 is exposed to the ambient conditions is much less than the other side or portion length $l_2$.

It is apparent that, within the scope of the invention, modifications and different arrangements may be made other than disclosed herein, and the present disclosure is illustrative only, the invention comprehending all variations thereof.

I claim:
1. Apparatus for producing a continuous multifilament strand comprising in combination:
   a container for holding a supply of molten glass, the container having a wall concave in all directions on its external surface;
   a plurality of tubular members extending radially from the surface through which the molten glass is delivered to their outlets as molten streams;
   means for attenuating filaments from the streams; and
   means for combining the filaments into a strand substantially at the center of curvature of the surface.

2. In apparatus for attenuating glass filaments from streams of molten glass and subsequently applying sizing fluid to them prior to combining the filaments into a strand, apparatus comprising:
   a container for holding a supply of the molten glass, the container having a wall concave in all directions on its external surface, the wall having openings through which the molten glass is delivered to their outlets as the molten streams; and
   means for combining the filaments into a strand substantially at the center of curvature of the surface.

3. Apparatus supplying streams of molten glass for attenuation into filaments as recited in claim 2 where the wall has a concave spherical shaped external surface.

References Cited
UNITED STATES PATENTS 2,635,389   4/1953   Toulmin _____ 65—2
2,980,956   4/1961   Whitehurst et al.

S. LEON BASHORE, Primary Examiner

R. L. LINDSAY, JR., Assistant Examiner

U.S. Cl. X.R.

18—8; 28—72, 75; 65—1, 4